United States Patent [19]
Nurse, Jr.

[11] Patent Number: 5,736,035
[45] Date of Patent: Apr. 7, 1998

[54] OUTLET FILTER FOR WASTE WATER TREATMENT TANK

[76] Inventor: Harry L. Nurse, Jr., 10409 Watterson Trail, Louisville, Ky. 40299

[21] Appl. No.: 699,470

[22] Filed: Aug. 19, 1996

[51] Int. Cl.⁶ .................................................. B01D 29/37
[52] U.S. Cl. ................... 210/172; 210/256; 210/299; 210/452; 210/459; 210/498; 210/532.2
[58] Field of Search ............................ 210/170, 172, 210/256, 299, 311, 452, 459, 461, 498, 532.1, 532.2

[56] References Cited

U.S. PATENT DOCUMENTS

| | | | |
|---|---|---|---|
| 441,667 | 12/1890 | Jewell | 210/452 |
| 603,120 | 4/1898 | Worthington | 210/498 |
| 1,675,714 | 3/1928 | Koch | 210/452 |
| 2,900,084 | 8/1959 | Zabel . | |
| 3,332,552 | 7/1967 | Zabel . | |
| 4,439,323 | 3/1984 | Ball | 210/532.2 |
| 4,710,295 | 12/1987 | Zabel | 210/532.2 |
| 5,221,470 | 6/1983 | McKinney | 210/311 |
| 5,382,357 | 1/1995 | Nurse | 210/532.2 |
| 5,449,453 | 9/1995 | Tang | 210/151 |
| 5,569,387 | 10/1996 | Bowne et al. | 210/532.2 |

*Primary Examiner*—Christopher Upton
*Attorney, Agent, or Firm*—Middleton & Reutlinger; Charles G. Lamb

[57] ABSTRACT

A filter device for use in a waste water treatment system including a filter element of two-piece construction disposed within a filter casing with a fluid chamber therein defined by an outer surface of the filter element and the inner surface of the filter casing. The filter casing has a central opening in the bottom which extends upwardly and is in flow communication with an outlet discharge from the tank. The filter element includes a first filter section having a main body of U-shaped cross-section with opposed outwardly extending L-shaped portions at each terminating end of the U. Each L-shaped portion is provided with a first locking device. A second filter section is of substantially flat configuration with the terminating sides of the second filter section having a second locking device therealong for mating with the first locking device of the first filter section. Both the first and second filter sections are provided with vertically spaced horizontally extending slots therein wherein liquid to be filtered passes through a central opening in the bottom of the filter element up through the filter element and outwardly through the slots into the defined chamber which is in flow communication with an outlet from the tank.

7 Claims, 2 Drawing Sheets

5,736,035

OUTLET FILTER FOR WASTE WATER TREATMENT TANK

BACKGROUND OF THE INVENTION

The present invention relates to filter devices and more particularly to liquid filter devices for use as an outlet filter in a waste water treatment tank or system.

In the treatment of waste water in a waste water treatment tank, such as a septic tank, it is common practice to install a filtering device at the outlet discharge from the tank. And, there have been a wide variety of filter devices utilized for these outlet filters. One particular filter which has found commercial success in waste water treatment systems, particularly in septic tanks, is described in my U.S. Pat. No. 5,382,357. This patent teaches a tubular filter element enclosed in a tubular casing wherein the inlet into the casing is in flow communication with the waste water to be filtered and the outlet from the tubular casing is in flow communication with the discharge outlet of a septic tank or the like. The tubular filter element is provided with a series of slots of preselected width extending through the tubular element and the tubular element has a central opening extending from the lower end to the top end. An annular area is provided between the tubular filter element and the casing and a seal means is provided between the tubular element and the inside of the casing at a location below the slots in the tubular element and above the outlet from the casing wherein fluid to be filtered is received in the central opening and flows upward and through the slots from the central opening to the annular area, and then to the outlet discharge from the tank. Even though the products made in accordance with the teachings of the U.S. Pat. No. 5,382,357 filter have found commercial success, improvements in the described invention have proved to be necessary for continued commercial success of a filter made in accordance with the principals described therein.

SUMMARY OF THE INVENTION

It is an object of the present invention to provide a filter device for the removal of solid material from fluids.

It is another object of the present invention to provide an improved filter device of the type having a filter element therein which receives a liquid to be filtered through a central opening within the filter element wherein the liquid flows from the inside of the element through slots of the element into an annular area defined by the outer surface of the filter element and a filter housing.

In the present invention, a filter element is of two-piece construction, a first filter section including a main filter body of U-shaped cross-section with opposed outwardly extending L-shaped portions wherein the outer terminating end of each L-shaped portion is provided with a first locking means. A second filter section is substantially flat with opposed sides wherein each side is provided with a second locking means for mating with the first locking means of the first filter section. The filter element consisting of two-piece construction is installed into a housing or filter casing of generally the same configuration as the filter element but with a chamber defined between the outer surface of the filter element and the inner surface of the casing, the chamber providing a flow-through passage of filtered liquid into an outlet discharge which is in flow communication with the chamber.

In the use of the terms waste water treatment systems or plants, these include, for example, aerobic and anaerobic systems, septic tanks, and the like.

Examples of filter devices within the scope of the present invention are illustrated in the accompanying drawings and described hereinafter but it will be understood that neither the drawings nor the descriptions thereof are presented by way of limitation and that other arrangements also within the scope of the present invention will occur to those skilled in the art upon reading the disclosure set forth hereinafter and the claims appended hereto.

DETAILED DESCRIPTION OF THE PREFERRED EMBODIMENT

Figure 1:
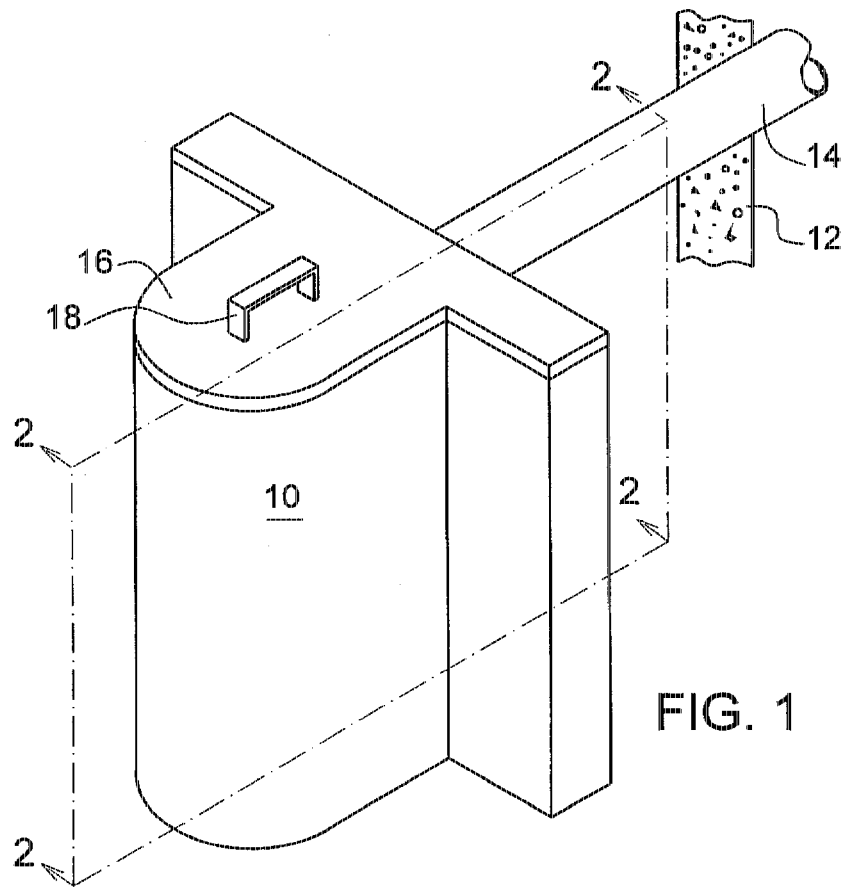
FIG. 1 is a perspective view of one preferred filter device of the present invention.

In FIG. 1 is shown a filter device 10 of the present invention in flow communication with an outlet discharge conduit 14 from a septic tank, the outlet discharge conduit 14 extending through one wall identified by the numeral 12 of the septic tank.

Figure 2:
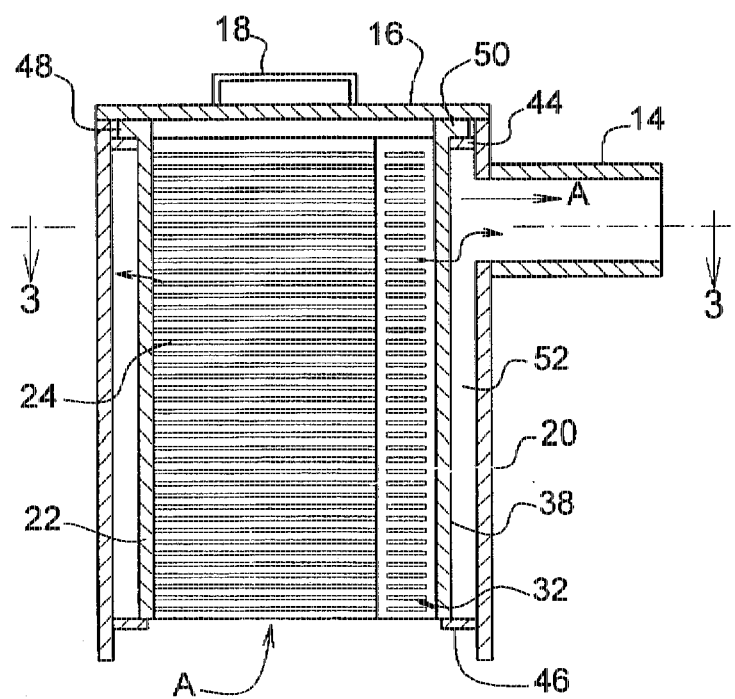
FIG. 2 is a cross-sectional view of the filter device of the present invention taken along lines 2—2 of FIG. 1.
Figure 3:
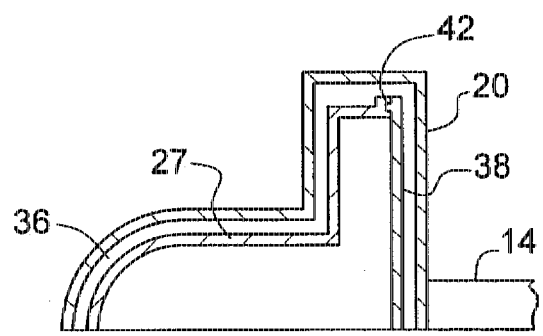
FIG. 3 is a cross-sectional view of the filter device of the present invention taken along lines 3—3 of FIG. 2; and, FIG. 4 is an exploded view of one filter element of the preferred embodiment.
Figure 4:
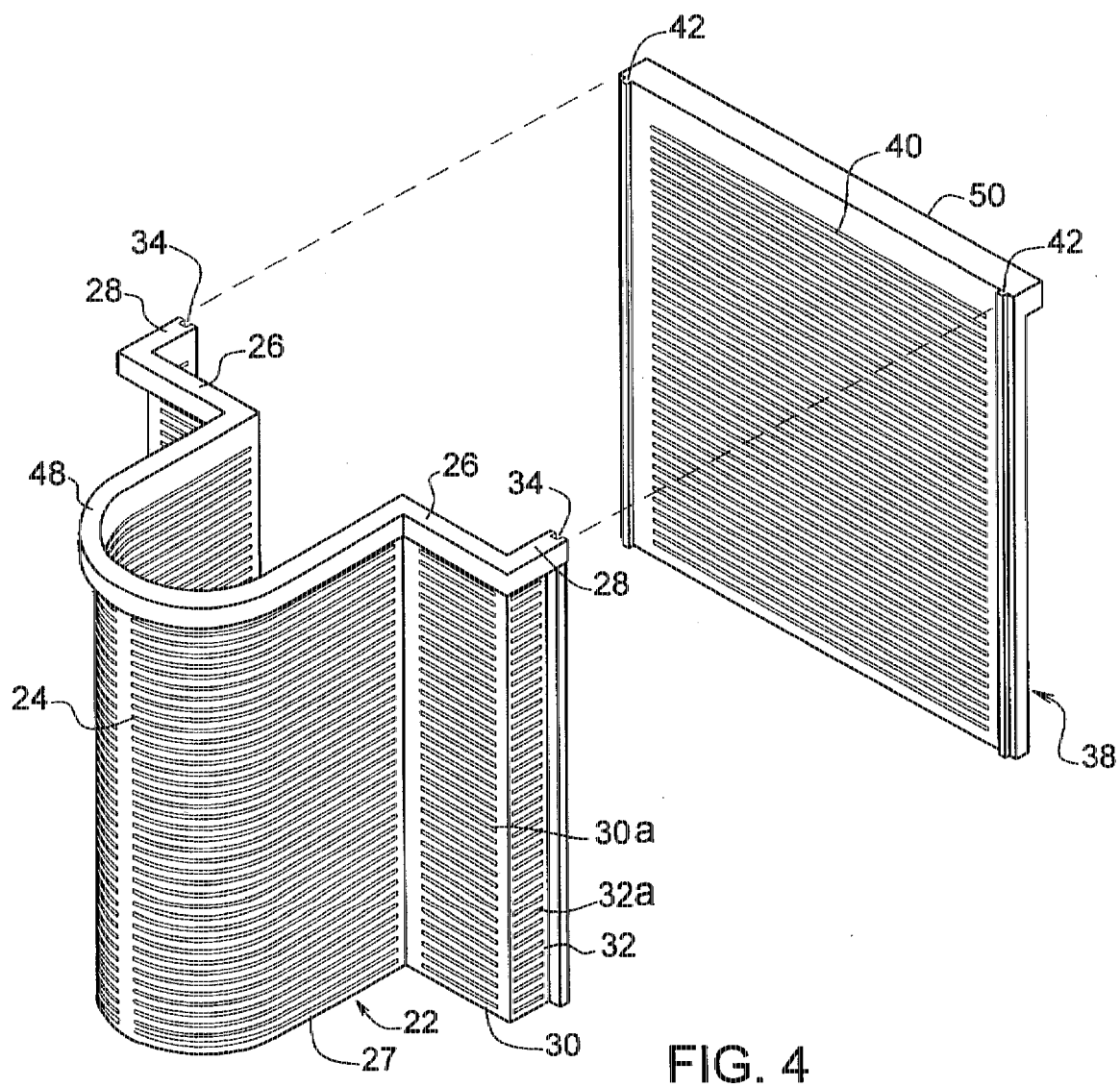

As shown in FIGS. 2 and 4, the filter device 10 includes a filter element in two-piece construction, the first filter section being of generally U-shaped construction and identified by the numeral 22, and a second filter section being a substantially flat filter element identified by the numeral 38, wherein the filter sections 22 and 38 are in interlocking relation. Moreover, the filter device 10 is provided with a cover 16 and a handle 18 thereon for easy removal, thereby making for easy replacement of the two filter sections 22 and 38.

As best shown in FIG. 4, the generally U-shaped filter section 22 is provided with a U-shaped filter portion 27 which includes a plurality of horizontally extending U-shaped slots 24 which are vertically spaced at preselected distances therealong. The width of the slots 24 are of a preselected width such as ⅛" to ⅜" to preclude the passage of solids of a particular size defined by the preselected width therethrough. The filter section 22 is also provided with a U-shaped flange 48 extending around the upper portion of the filter section and as best shown in FIG. 2, the flange 48 rests upon top seal 44 which extends along the inner periphery of the filter casing 20. At the terminating ends of the U-shaped portion 27 of the filter section 22 are outwardly extending opposed L-shaped filter portions including legs 30 and 32 which are also provided with horizontally extending slots 30a and 32a, respectively, therethrough and vertically spaced at preselected distances therealong. Along the top of the L-shaped portion 30 and 32 are also provided a pair of opposed outwardly extending L-shaped flanges comprising an inner leg identified by numeral 26 with an outer terminating leg identified by numeral 28. Flange legs 26 and 28 also rest upon top seal 44. The filter legs 32 at their terminating ends are provided with locking means for locking with the second filter section 38. As shown in FIG. 4, one locking means is exemplified as groove 34.

Also shown in FIG. 4 is the second filter section 38 which is sized for mating relation with the first filter section 22. The filter section 38 is provided with a plurality of vertically spaced horizontally extending slots 40 of substantially the same width as slots 24 in filter section 22. The filter section 38 is also provided with a flange portion 50 along its top which also rests upon the top seal 44, as shown in FIG. 2. The filter section 38 is provided with a pair of spaced tongues 42 which are disposed for friction interlocking with the grooves 34 in the filter element 22.

As shown in FIG. 2, a bottom seal 46 extending around the inner periphery of the casing 20 is provided to receive the filter elements 22 and 38 thereon. Seal 46 prevents flow of waste water into chamber 36 which is defined by the inner surface of casing 20 and the outer surface of filter sections 22, 38 except through the slots in the filter sections.

Several procedures can be used to produce the filter element which are within the scope of the present invention. In a preferred embodiment the filter sections 22 and 38 are of molded plastic construction with the locking means to lock the filter section 22 and 38 being of tongue and groove type construction. However, it is realized that other locking devices may be utilized for locking the two filter sections 22 and 38 together.

In operation, waste water identified by the letter A flows through the central opening in the casing 20 up into the central opening defined by the interior of the filter sections 22 and 38 and out through the slots 24, 30a, 32a and 40 into the chamber 36 defined by the inner surface of the filter casing 20 and the outer surfaces of the filter sections 22 and 28. The filtered liquid then passes from the chamber 36 out through the outlet discharge 14.

Even though an example of the preferred embodiment is shown and discussed with reference to sewage treatment and other waste water treatment systems, it will be understood that other devices within the scope of the present invention can be easily and effectively used in other applications, such as, for example, the removal of sand and the like from drainage water.

Thus, it will be understood that the foregoing examples of the preferred embodiment are not by way of limitation and that other arrangements also within the scope of the present invention will occur to those skilled in the art upon reading the disclosure set forth hereinbefore.

What is claimed is:

1. In combination with a waste water treatment tank, a filter device for separation of solid matter from a liquid comprises:

a filter casing having an open bottom, a closed top and an outlet opening;

an outlet discharge conduit in said tank in flow communication with said filter casing outlet opening;

a filter element of two-piece construction disposed within said casing with a spacing therebetween defining a liquid flow-through chamber, said filter element including a first filter section including a main body portion of generally U-shaped cross-section terminating with opposed outwardly extending L-shaped portions having an inner leg and an outer leg, the outer leg of each L-shaped portion including a first locking means; and, a second filter section being substantially flat with opposed sides, each side having a second locking means in mating relation with said first locking means of said first filter section, said first and second filter sections in a locked arrangement defining a central opening therethrough; and, a bottom seal extending around the inner periphery of said filter casing at a location below a bottom of said filter element and in contact with said filter element whereby all liquid flows upward through said central opening.

2. The filter device of claim 1 including horizontally extending slots in said main body of U-shaped cross-section extending from substantially each end of the U-shaped first filter section and spaced vertically at preselected distances along the length of the first filter section.

3. The filter device of claim 2 including horizontally extending slots in said L-shaped portions spaced vertically at preselected distances along the length of said L-shaped portions.

4. The filter device of claim 2 including horizontally extending slots in said second filter section spaced vertically at preselected distances along the length of said second filter section.

5. The filter device of claim 1, one of said locking means being a vertically extending groove and the other of said locking means being a vertically extending tongue.

6. The filter device of claim 5, the one of said locking means being said first locking means and the other of said locking means being said second locking means.

7. The filter device of claim 1, said filter casing having a top seal extending around the inner periphery of said casing, said filter element having an outwardly extending flange around the outer periphery of the top of said filter element engaging said top seal.

* * * * *